United States Patent
Brodsky et al.

(10) Patent No.: US 7,865,535 B2
(45) Date of Patent: Jan. 4, 2011

(54) APPARATUS, SYSTEM, AND METHOD FOR A DATA SERVER-MANAGED WEB SERVICES RUNTIME

(75) Inventors: Stephen A. Brodsky, Los Gatos, CA (US); Suavi A. Demir, San Jose, CA (US); Michael Schenker, San Jose, CA (US); Peter Wansch, San Jose, CA (US); Maryela E. Weihrauch, San Jose, CA (US)

(73) Assignee: International Business Machines Corporation, Armonk, NY (US)

(*) Notice: Subject to any disclaimer, the term of this patent is extended or adjusted under 35 U.S.C. 154(b) by 230 days.

(21) Appl. No.: 11/750,886

(22) Filed: May 18, 2007

(65) Prior Publication Data
US 2008/0288547 A1  Nov. 20, 2008

(51) Int. Cl.
*G06F 7/00* (2006.01)
(52) U.S. Cl. .............................. 707/805; 707/999.102; 707/709
(58) Field of Classification Search .............. 707/1–10, 707/100, 805, 999.102
See application file for complete search history.

(56) References Cited

U.S. PATENT DOCUMENTS

| | | | |
|---|---|---|---|
| 7,072,807 B2 | 7/2006 | Brown et al. | 703/1 |
| 7,296,061 B2 * | 11/2007 | Martinez et al. | 709/211 |
| 7,349,980 B1 * | 3/2008 | Darugar et al. | 709/238 |
| 2003/0028685 A1 * | 2/2003 | Smith et al. | 709/328 |
| 2003/0033432 A1 * | 2/2003 | Simpson et al. | 709/246 |
| 2003/0055624 A1 * | 3/2003 | Fletcher et al. | 704/2 |
| 2003/0097464 A1 * | 5/2003 | Martinez et al. | 709/238 |
| 2003/0126136 A1 * | 7/2003 | Omoigui | 707/10 |
| 2004/0044656 A1 | 3/2004 | Cheenath | 707/3 |
| 2004/0045004 A1 | 3/2004 | Cheenath | 719/310 |
| 2005/0278348 A1 | 12/2005 | Falter et al. | 707/100 |
| 2006/0031850 A1 | 2/2006 | Falter et al. | 719/320 |
| 2006/0069777 A1 | 3/2006 | Kato et al. | |
| 2006/0206599 A1 | 9/2006 | Milligan et al. | 709/223 |
| 2006/0288018 A1 | 12/2006 | Ally et al. | 707/100 |
| 2007/0067384 A1 | 3/2007 | Angelov | |
| 2007/0073844 A1 | 3/2007 | Schmidt et al. | |

OTHER PUBLICATIONS

"1.2 A Short Introduction to Web Services," Chapter 1. Key Concepts, Apr. 30, 2007. http://gdb.globus.org/gt4-tutorial/multiplehtml/ch01s02.html.

* cited by examiner

*Primary Examiner*—Mohammad Ali
*Assistant Examiner*—John P Hocker
(74) *Attorney, Agent, or Firm*—Kunzler Needham Massey & Thorpe

(57) ABSTRACT

An apparatus, system, and method for creating and managing a data server-managed web services runtime. A generic web service runtime module and associated runtime controller are deployed on an application server. The runtime controller monitors a web services management metadata store for changes in the web service metadata defining the available data access based web services. If a change is detected, the generic web services runtime automatically updates the web service artifacts and web service endpoint interface associated with the affected web service such that the change in the web service metadata is reflected in the data access-based web service. A user manages the web services management metadata store and defines and manages data access-based web services from the database containing the web services management metadata store without interacting with the application server.

30 Claims, 7 Drawing Sheets

APPARATUS, SYSTEM, AND METHOD FOR A DATA SERVER-MANAGED WEB SERVICES RUNTIME

BACKGROUND OF THE INVENTION

1. Field of the Invention

This invention relates to the creation of, and management of, web services. More specifically, the invention relates to the creation of a web service which is defined and managed by way of a database management system.

2. Description of the Related Art

The computing world is far from homogeneous; various platforms, languages, and operating systems are available and in use across the globe. In addition, computers within the same organization or network often operate on different platforms. Allowing these entities to communicate with one another is often very difficult given that they do not 'speak the same language.' The inability of computers to communicate across platforms increases expenses when functional legacy systems need to be replaced simply to provide compatibility, or when programmers have to translate, or 'port' code from one computing language to another to provide the same functionality on a different machine.

Web services provide a solution to the problem by providing a standard means for communicating across different platforms and frameworks in a network. Web services are application components which are self-contained and self-describing using open protocols for communication. These services can be invoked by a client regardless of the underlying platforms of the service provider and the client so long as both participants to the transaction adhere to the accepted web services protocols. Typically, in a web service environment, clients and servers communicate XML messages, adhering to the HTTP protocol, and using the SOAP standard. Web services may use different service invocation languages (such as XML-RPC), and other transfer protocols, but SOAP and HTTP currently are the most popular choices.

Generally, web services are meant to be invoked by client applications, as opposed to being used directly by humans. Web services can allow an entity to share information while maintaining control over the source of the information. For example, web services can be used to by companies to provide clients with access to certain information without exposing the entire database and creating vulnerabilities. For example, a web service can be developed to allow a client to retrieve a user's address, as stored in the company's database, and update that address as needed. The web service allows the client application to access this information regardless of the platform that is being used, so long as both sides use the same agreed-upon protocols. In addition, the company does not have to open the database to the clients in order to provide the information, making it a more secure method of information sharing.

Typically, creating a web service to expose data involves a service provider creating an application and placing the code on an application server. The management of the web service and its life cycle is all done on the application server (often referred to as the application server side or tier). Although intuitive to those familiar with application servers, this approach to exposing data through a web service has a number of difficulties.

First, creating and managing web services on an application server can be difficult for Database Administrators and others who have limited experience working outside of the database environment. The process of writing web services, deploying them on an application server and then managing them from that point can be cumbersome for an individual with a specialization in database, creation, design, and management. If the Database Administrator lets another individual, such as an Application Server administrator, create and manage the web services for the database, the Database Administrator is giving up some control of the database; access to the data is now possible through a web service managed on a separate server by a separate individual. The developed web services may allow changes to the data that the Database Administrator did not intend to allow, and shutting down the web services to allow for maintenance at the database adds a layer of complexity when the web services need to be stopped and restarted at the application server by a Systems Administrator.

Even for those familiar with application servers, developing and deploying web services, such as those used to access information in a database, is often a time-consuming process. To develop a web service, an application developer codes the service in a supported programming language such as Java or C++, writes SQL, XQuery or other data access statements to access information in the database, provides namespaces, operation names, and message style, and then packages the code in a deployable component. To deploy the web service, the web application administrator sets up and configures a data source for a data server, deploys the web service as an application, and configures settings for the web service such as security and resource references. The web application administrator also manages the life-cycle of the web service, which may require repeating many of the above steps.

In addition, if a web service is distributed over multiple application servers or nodes in order to provide high availability, the code for the web service must be manually copied, maintained, and kept in synchronization across all servers on which the code is located. These applications servers themselves may not be of a uniform type, requiring the user to handle each individual case of deployment and management according to the requirements of each system. As a result of the foregoing, creating, developing, and maintaining web services can impose a high cost on an organization at all points in the web service lifecycle, particularly in a heterogeneous environment.

From the foregoing discussion, it is apparent that there is a need for a data server-managed web service tool which allows a Database Administrator or other user familiar with the database tier or side to easily and efficiently create, control, and deploy web services from the database side, as opposed to the application server side. The tool should ideally insulate the details of running and managing the web service on an application server such that a Database Administrator can effectively monitor and manage the web services from a Database Management System (DBMS). The tool should also centralize the management of the web service regardless of the number and type of application servers on which the web service is deployed.

SUMMARY OF THE INVENTION

The present invention has been developed in response to the present state of the art, and in particular, in response to the problems and needs in the art that have not yet been fully solved. Accordingly, the present invention has been developed to provide an apparatus, system, and method for creating and managing a data server-managed web services runtime that overcomes many of the above referenced shortcomings in the art.

The present invention comprises a computer program product, the operations of the computer program product comprising accessing web service metadata in a web services management metadata store, determining that there is a change in the web service metadata in the web services management metadata store, and automatically managing a data access-based web service in response to a change in the web service metadata in the web services management metadata store, wherein the data access-based web service is configured to execute in cooperation with a generic web service runtime module deployed on an application server, the application server configured to support dynamic deployment of web services.

Where a change in the web service metadata comprises web service metadata added to a web services management metadata store, automatically managing a data access-based web service further comprises retrieving a web service configuration document from the web services management metadata store, creating a web service artifact from the web service configuration document, the web service configuration document satisfying a web service configuration schema, and starting a web service artifact such that a request processor associated with the generic web service runtime module accepts requests associated with the web service artifact. Starting a web service artifact further comprises a web service artifact executing web service requests without a generic web service runtime module restarting.

Where a change in the web service metadata comprises web service metadata removed from the web services management metadata store, automatically managing a data access-based web service comprises inactivating a web service runtime artifact associated with the data access-based web service identified by the removed web service metadata.

In certain embodiments, a change in the web service metadata is determined by evaluating a timestamp associated with a web service defined in the web services management metadata store. In addition, the computer program product may further comprise a user defining the web service metadata in the web services management metadata store. The web service metadata further comprises a web service name, a web service configuration document, a web services description language document, a web service status, and a timestamp.

In certain embodiments the web service configuration document is an XML file, the web service configuration schema is an XML Schema document, and the web service configuration document specifies Structured Query Language (SQL) data operations on a data store. The computer program product may further comprise publishing a web services description language (WSDL) document associated with the data access-based web service.

Also disclosed is a system for operation of a data server-managed web services runtime, the system comprising an application server configured to support dynamic deployment of web services and host a plurality of web services runtime modules, the application server comprising a memory device and at least one processor. The system further comprises a web services management metadata store comprising a web service name, a web service configuration document, a web services description language (WSDL) document, a web service status and a timestamp, and a data access-based web service data data store comprising web service-accessible data and stored procedures. The system further comprises a runtime controller configured to operate on the application server and to manage a single unique generic web service runtime, and a generic web service runtime module configured to operate on the application server and to create one or more web service artifacts for one or more web services based on a web service configuration document.

In certain embodiments the system also comprises a web service metadata tool configured to communicate with the web services management metadata store, the web service metadata tool configured to expose a user to data access-based web service data and stored procedures available for deployment as a data access-based web service and to receive metadata from the user, the metadata defining a new data access-based web service. The web service metadata tool further generates a web service configuration document and a WSDL document from the user metadata, and stores a web service name, the web service configuration document, the WSDL document, a status, and a timestamp in the web services management metadata store.

The runtime controller further comprises a synchronization module configured to determine a change in the web services management metadata store and to notify the generic web service runtime module of the change, an endpoint interface synchronization module configured to maintain web service endpoint interface definitions in a web service engine, and a management module configured to enable start and stop operations on web service artifacts on a generic web services runtime module.

The present invention also discloses a system for the operation of a data server-managed runtime, wherein the system comprises a plurality of application servers configured to support dynamic deployment of web services and host a plurality of web services runtime modules and runtime controllers, a plurality of databases, the databases further comprising a common web services management metadata store and a common data access-based web service data data store, a plurality of web service runtime modules configured to operate on one of the plurality application servers and to create one or more web service artifacts for one or more web services based on a web service configuration document, and a plurality of generic web service runtime modules configured to operate on one of the plurality of application servers and to create one or more web service artifacts for one or more web services based on a web service configuration document.

The generic web services runtime modules on a plurality of application servers further comprise redundant web service artifacts defining data access-based web services, the redundant web service artifacts derived from web service metadata stored in the common web services management metadata store. In certain embodiments, the plurality of application servers comprises heterogeneous platforms. An application server may also comprise a plurality of runtime controllers and generic web service runtime modules, where the runtime controllers have an associated unique generic web service runtime module.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE INVENTION

Figure 1:
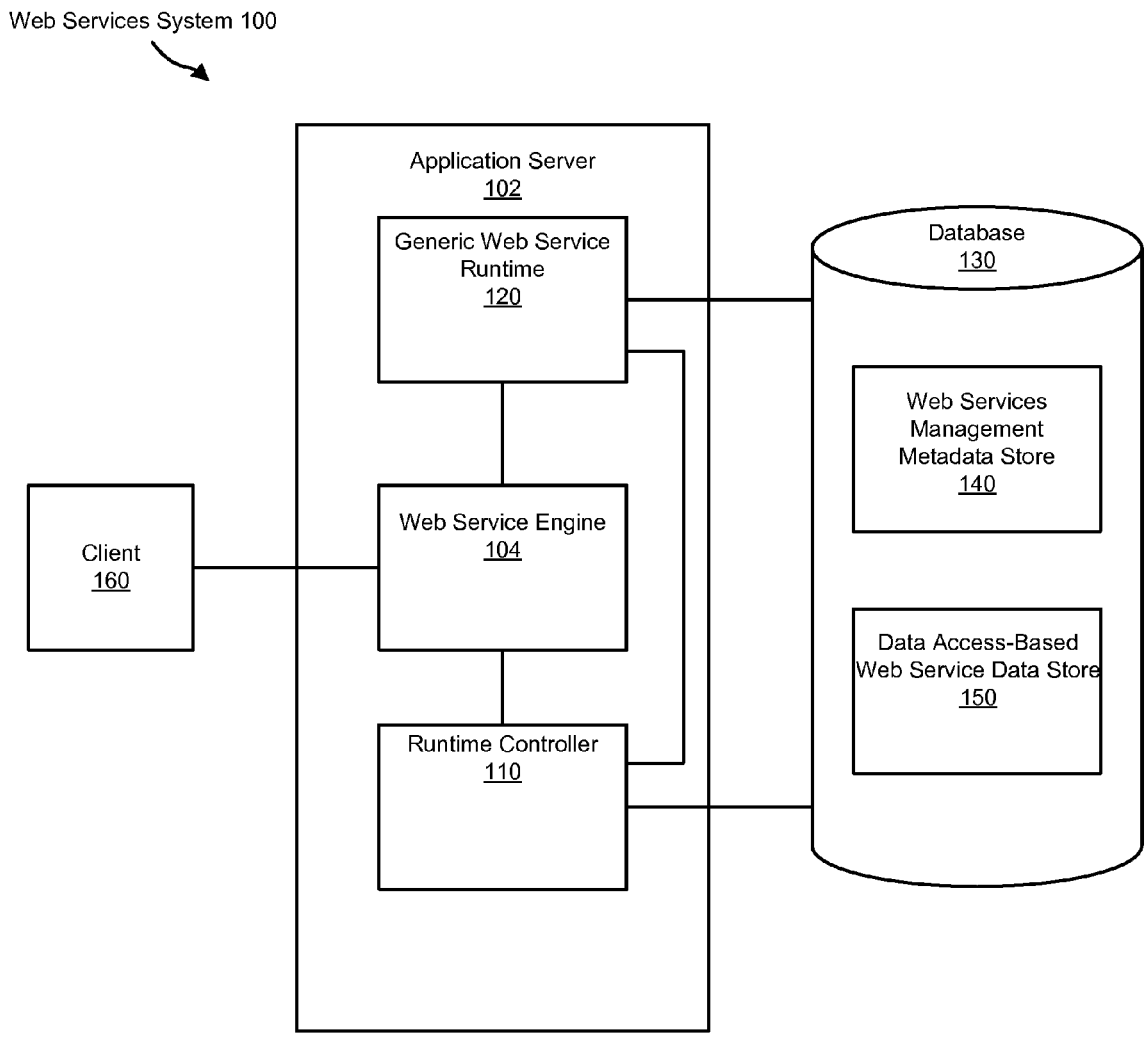
FIG. 1 is a schematic block diagram illustrating one embodiment of a web services system in accordance with the present invention.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as a processor and memory device, field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code lines, among different programs, and across several memory devices. Similarly, operational data may be identified and illustrated herein within modules and may be embodied in any suitable form and organized within any suitable type of data structure. The operational data may be collected as a single data set, or may be distributed over different locations including over different storage devices.

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware processors and memory, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

FIG. 1 is a block diagram illustrating one embodiment of a web services system 100 in accordance with the present invention. While the depicted embodiments throughout this application make specific reference to web services and a web service system, those of skill in the art will recognize that the present invention relates to all network protocols. The web services system 100 includes a client 160, an application server 102, and a database 130. The web services system 100 allows a client 160 to access services and resources associated with the application server 102 and the database 130 regardless of the inherent compatibility of the underlying platforms of each piece. The web services system 100 enables distributed computing, where the client 160 can access resources associated with the database 130, as defined by the available web services, without executing those operations directly on the database 130; rather, the client 160 requests an available operation from the application server 102, which executes the operations associated with the request, and returns the results to the client 160.

While the web services system 100 is capable of providing any number of web services, the focus of this invention is data access-based web services. A data access-based web service is a web service whose primary function is to perform database operations on a database 130. These operations may include adding, removing, or editing tables and records in the database 130, as well as accessing stored procedures. The data access-based web service may also include other operations as part of the web service. For example, a data access-based web service may perform additional operations on the data retrieved from the database 130, such as conversion from one form of currency to another, before returning the result.

The application server 102 is a software program configured to execute and manage a plurality of applications. The applications deliver application services to client computers or devices. The application server 102 typically includes middleware and the known modules to provide web services.

In one embodiment, the application server 102 is an IBM WebSphere™ Application Server, available from International Business Machines of Armonk N.Y. The application server 102 may serve as part of a service-oriented architecture to provide data access services.

The application server 102 further supports dynamic deployment of web services. Dynamic deployment, or 'hot deployment' and 'dynamic reloading', allows components to be added to the application server 102 or components to be edited without stopping and/or restarting the application server 102 before those changes take effect. Dynamic deployment also allows the removal of components without restarting the application server 102. In an application server 102 supporting dynamic deployment, web service deployment information can be added to, or removed from, the web service engine 104 (also commonly referred to as the SOAP engine) and the web service engine 104 will accept and respond to these changes without requiring that the application server 102 restart.

An application server 102 further comprises a web service engine 104. The web service engine 104 receives, interprets, and handles web services requests from clients 160. The web service engine 104 also packages and sends web services responses to a client 160. Various commercial and open-source web service engines exist. In one embodiment, the web service engine 104 is the Apache Axis engine.

In a preferred embodiment, the web service engine 104 is a Simple Object Access Protocol (SOAP) engine capable of receiving and generating SOAP messages. The W3C specification defines SOAP as a lightweight protocol for exchanging structured information in a decentralized, distributed environment. The SOAP message comprises three parts: an envelope defining a framework for describing the contents of a message and how to process it, encoding rules for expressing application-defined datatypes, and a convention for representing remote procedure calls and responses. The web service engine 104 receives and interprets, and also composes and sends, SOAP messages.

In accordance with the present invention, the application server 102 further comprises a runtime controller 110. The runtime controller 110 manages the generic web service runtime module 120. The runtime controller 110 tracks and monitors web service metadata in the web services management metadata store 140 and ensures that the service endpoints in the web service engine 104 are kept current. This particular feature of the runtime controller 110 is discussed in greater detail in connection with FIGS. 3 and 6.

Each generic web service runtime module 120 has an associated runtime controller 110. In addition, the runtime controller 110 is configured to communicate with the database 130 and the web services management metadata store 140. A user may deploy multiple runtime controllers 110 and multiple generic web service runtime modules 120 on an application server 102, so long as each generic web service runtime module 120 has a unique runtime controller 110.

In accordance with the present invention, the application server 102 further comprises a generic web service runtime module 120. The generic web service runtime module 120 serves as an operating environment for data access-based web services. The generic web service runtime module 120 creates data access-based web services from web service metadata stored in the web services management metadata store 140. These data access-based web services retrieve data from the data access-based web service data data store 150 in response to a web service request. The generic web service runtime module 120 provides one or more executable computer instructions that enable each data access-based web service to fulfill web service requests and generate proper web services responses. As mentioned above, a data access-based web service is a web service whose primary function is to perform database operations on a database 130. These operations may include adding, removing, or editing tables and records in the database 130, as well as accessing stored procedures. Data access-based web services may also perform additional operations or actions in conjunction with the database operations.

The generic web service runtime module 120 employs the web service engine 104 to receive and respond to web service requests. In one embodiment, the generic web service runtime module 120 also publishes a web services language description document (WSDL) which contains a description of a web service, including the methods, parameters, and output of a related web service which is used by a caller in a client 160 to execute the web service. The WSDL is the contract between the service requester and the service provider. The function of the generic web service runtime module 120 is discussed in greater detail in connection with FIGS. 3 and 6.

The web services system 100 further comprises a client 160. The client 160 represents an entity requesting a web service from the application server 102. The Client 160 sends the request in conformance with the SOAP protocols and in accordance with the description set forth in a WSDL document.

The web service system 100 further comprises a database 130. The database 130 comprises a structured set of data and a database management system (DBMS) such as IBM's DB2 system or other system as known to those in the art. The database 130 includes a web services management metadata store 140 and a data access-based web service data data store 150.

The web services management metadata store 140, in one embodiment, comprises a table of records containing the web service metadata that specifies the behavior and structure of a web service. While the term 'metadata' is used throughout the application, those of skill in the art will recognize that metadata is only one way for providing the required control data necessary for specifying the operation of the present invention. The contents and creation of the web services metadata is discussed in greater detail in relation to FIG. 2. The configuration of the web services management metadata store 140 is discussed in greater detail in FIG. 5. The generic web service runtime module 120 defines data access-based web services based on the web services metadata stored in the web services management metadata store 140.

The database 130 further comprises a data access-based web service data data store 150. The data access-based web service data data store 150 contains the data that is the subject of, and available to, a data access-based web service. For example, a company's employee records may comprise a portion of the data access-based web service data data store 150. As such, that information may be used as the subject of an appropriate web service.

Those skilled in the art will recognize that the web services system 100 is simply one of many possible configurations. For example, the web services management metadata store 140 and the data access-based web service data data store 150 need not be located on the same database 130, so long as the connection information to the stores is properly provided to the runtime controller 110 and the generic web service runtime module 120. Further, the web services system 100 may comprise multiple application servers 102. These servers may similarly comprise a runtime controller 110 and a generic web service runtime module 120 which are also in connection with database 130. There is no restriction on the number of runtime controllers 110 and generic web service runtime modules 120 which may be associated with a database 130 and the related data stores. An alternative configuration for a web services system 100 is discussed in greater detail in connection with FIG. 4.

Figure 2:
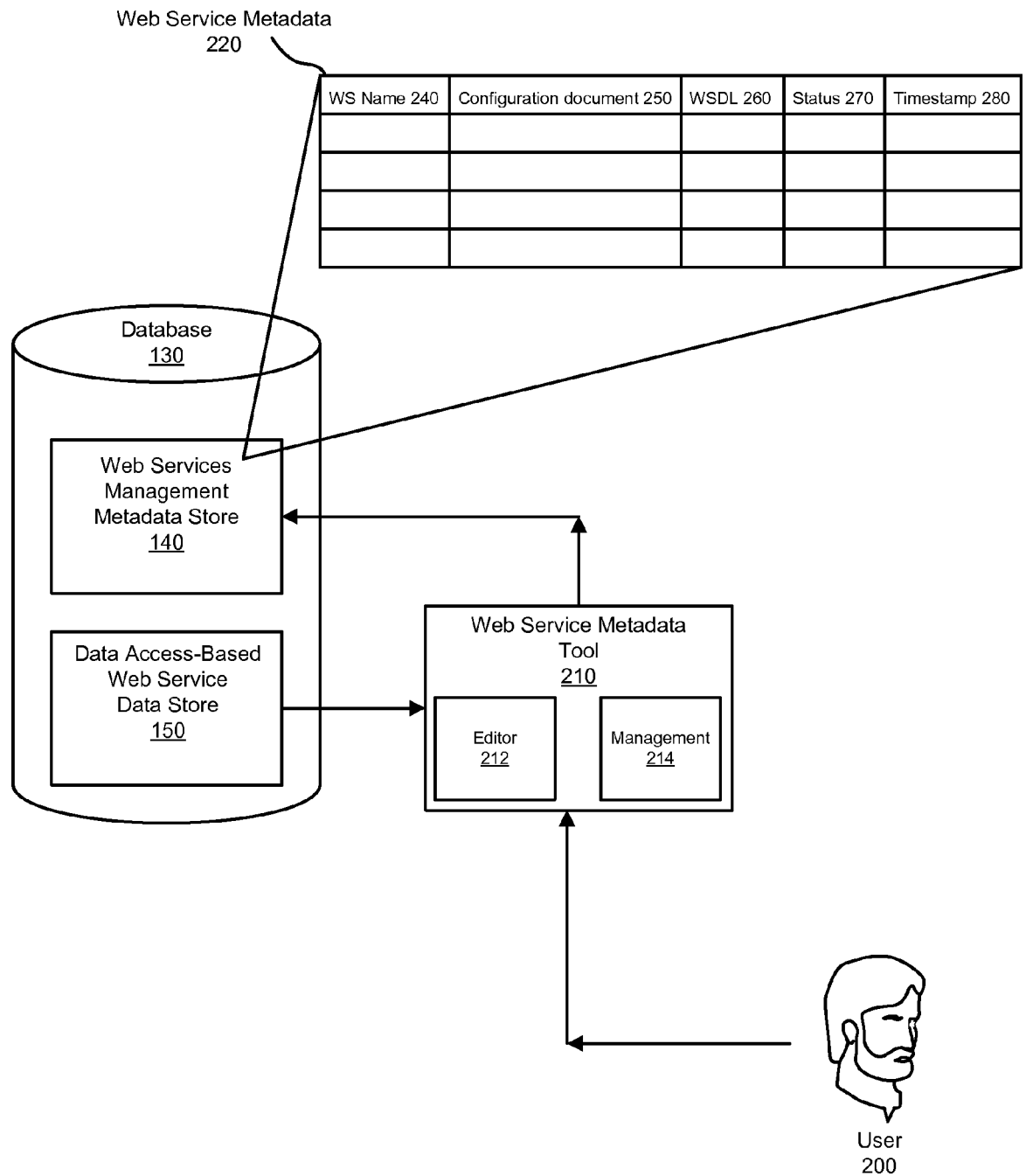
FIG. 2 is a schematic block diagram illustrating one embodiment of a database and web service metadata tool in accordance with the present invention.

FIG. 2 is a schematic block diagram illustrating one embodiment of a database 130 and a web service metadata tool 210 in accordance with the present invention. The database 130 includes a web services management metadata store 140 and data access-based web service data data store 150. As discussed above, the web services management metadata store 140 contains web service metadata 220 describing a web service in a format accessible to a generic web service runtime module 120 and a runtime controller 110. The web service metadata 220 describes a data access-based web service defined by a user 200. The generic web service runtime module 120 uses the web service metadata 220 to create a web service that conforms to the user 200's definition. The contents of the web service metadata 220 are described in greater detail below.

The data access-based web service data data store 150 contains the 'raw' data that the web services are intended to access and perform operations on. This data access-based web service data data store 150 includes data organized in a relational database of tables and rows or data in a hierarchical database. In addition, the data access-based web service data data store 150 may include stored procedures. In one embodiment, the data access-based web service data data store 150 comprises records stored in a database 130. As mentioned above, the data access-based web service data data store 150 may comprise any stored information accessible to the generic web services runtime module 120.

The web service metadata tool 210 is one method for a user 200 to enter web service metadata 220 into the web services management metadata store 140. While a user 200 may insert the web service metadata 220 manually into the web services management metadata store 140, in a preferred embodiment the web service metadata tool 210 provides this functionality. The web service metadata tool 210 provides tooling which allows the user 200 to easily specify the operations of a data access-based web services and, from that user specification, generates the web service metadata 220 that describes that service in a way that the generic web services runtime module 120 can understand. The web service metadata tool 210 also provides the user 200 with an interface on the database side from which the user 200 can start, stop, and otherwise manage the day-to-day operations of a defined data access-based web service. To facilitate these functions, the web service metadata tool 210 further comprises an editor module 212 and a management module 214. The editor module 212 allows a user 200 to create new data-access based web services, edit existing data-access based web services, or delete data-access based web services made available in accordance with the present invention.

The management module 214 allows a user 200 to perform administrative functions related to data-access based web services. For example, the management module 214 may allow a user 200 to disable a particular data-access based web service without affecting the other data-access based web services made available through the generic web service runtime module 120. In addition, the management module 214 may allow a user 200 to create a schedule specifying times during which the data-access based web services are available or offline, allowing easy coordination of data-access based web service access with other database administrative tasks such as back up process, during which access to the data access-based web service data data store 150 may be cut off.

In the depicted embodiment, a user 200 is a Database Administrator or other individual developing a data access-based web service from a database 130. The user 200 creates the data access-based web service by operating the web service metadata tool 210. The web service metadata tool 210 may comprise software that is part of a DBMS such as IBM's DB2, IBM's IMS, Oracle, MS SQL server, a plug-in, or other configuration allowing for communication with and operations on data within a database 130.

The web service metadata tool 210, in one embodiment, first performs a resource discovery function on the database 130. The resource discovery function determines what data in the database 130 may be accessed by a database operation such as an SQL statement. The web service metadata tool 210 exposes this discovered accessible data to a user 200 as data available for use as part of a web service.

While this specification frequently makes reference to SQL statements as the relevant database operations, those of skill in the art will recognize that SQL is not the only query language or means to perform database operations. A user may use other query languages such as XQuery to perform the specified operations. References to SQL statements throughout this specification can be replaced with references to XQuery statements or other means for executing database operations. The use of SQL statements simply constitutes one of many possible embodiments.

The user 200 provides a web service name and may select from the discovered data, which is a part of the data access-based web service data data store 150, what to incorporate into that named data access-based web service. The user 200 may also specify what parameters the data access-based web service will expect to receive and what SQL code may be necessary to perform the desired operations on the selected data. In addition, the user 200 may specify other operations that should be performed either prior to, or after, execution of the SQL statements. The user 200 can also specify what the data-access based web service will return to the user in the event that the requested data is not found or some other error occurs in the execution of the web service.

For example, a user 200 may create a data access-based web service called "getFiveYearAverage" which takes an employee ID number as a parameter and returns the average salary of that employee over the past five years. In this particular example, the data access-based web service data data store 150 does not have an average salary field; however, the resource discovery function performed by the web service metadata tool 210 indicates that a field "EmplSalary" is available. The user 200 uses the web service metadata tool 210 to select the "EmplID" and "EmplSalary" fields for the data access-based web service and generates the SQL code necessary to extract five salary values associated with that employee ID for five years into the past from the present date. The user 200 may then write additional code to calculate the average salary based on the five retrieved salary values and return the result of the calculation. The user 200 may further specify that a value of negative one is returned if a salary for any of the five years could not be retrieved.

The web service metadata tool 210 may provide the functionality above through any number of ways familiar to those skilled in the art; the web service metadata tool 210 may comprise a graphical user interface (GUI) from which the user 200 can select fields and operations for the web service, or otherwise provide a means for receiving from a user identification of the relevant data and operations.

The web service metadata tool 210 takes the input from the user 200 and creates the web service metadata 220. The web service metadata 220 describes the operations of a web service, and provides the necessary information for the generic web service runtime module 120 to create the web service. However, the web service metadata 220 is not itself a program that alone acts as a web service; rather, the web service metadata 220 is a description of the behavior and operation of a web service. The web service metadata 220 is stored in the web services management metadata store 140 on the database 130. One embodiment of the web service metadata 220 created by the web service metadata tool 210 is shown in FIG. 2. The web service metadata 220 comprises a web service name (WS name) 240, a web service configuration document 250, a web service description language document (WSDL) 260, a status 270, and a timestamp 280.

The web service name 240 comprises an identifier of a web service record in the web services management metadata store 140. In one embodiment, the web service name 240 constitutes a key for the table. A web service name 240 may be provided by the user 200 through the web service metadata tool 210 as part of the web service creation process, or the web service name 240 may be generated by the web service metadata tool 210.

The web service configuration document 250 is a document describing the methods, operations, and subject of the web service in a format that a generic web service runtime module 120 can interpret. The interpretation of a web service configuration document 250 in accordance with the present invention is presented in greater detail in connection with FIGS. 3 and 6.

The web service configuration document 250 contains information concerning the name of the web service, the operations, and the fields in the database 130 associated with the web service. The web service configuration document 250 also contains the executable database operations performed as part of the web service.

In one embodiment, the web service configuration document 250 is an XML document and the database operations are specified as SQL statements. For example, a web service providing operations to add an employee record, remove an employee record, get an employee record, and update an employee record may have a corresponding web service configuration document 250 as follows:

```
<?xml version="1.0" encoding="UTF-8" ?>
<dsc:config xmlns:dsc="http://ibm.com/datatools/dsws/config"
    buildNumber="2007/04/23 09:49:53:109 PDT" dbType="JDBC"
    restBinding="true" serviceName="EmployeeManagementService"
    soapBinding="true" targetNamespace="urn:example" xmlns:tns="urn:example">
<dsc:operations>
    <dsc:update operationName="addEmployee">
        <dsc:statement>
            <![CDATA[ INSERT INTO EMPLOYEE values (:empno, :firstname, :midinit,
            :lastname, :workdept, :phoneno, :hiredate, :job, :edlevel, :sex, :birthdate, :salary,
            :bonus, :comm) ]]>
        </dsc:statement>
    </dsc:update>
    <dsc:update operationName="removeEmployee">
        <dsc:statement>
            <![CDATA[ DELETE from EMPLOYEE where empno =:empno ]]>
        </dsc:statement>
    </dsc:update>
    <dsc:query operationName="getEmployee">
        <dsc:statement>
            <![CDATA[ SELECT * from Employee ]]>
        </dsc:statement>
    </dsc:query>
    <dsc:update operationName="updateEmployee">
        <dsc:statement>
            <![CDATA[ update employee set (empno, firstnme, midinit, lastname, workdept,
            phoneno, hiredate, job, edlevel, sex, birthdate, salary, bonus, comm) = (:empno,
            :firstname, :midinit, :lastname, :workdept, :phoneno, :hiredate, :job, :edlevel, :sex,
            :birthdate, :salary, :bonus, :comm) where empno = :empno ]]>
        </dsc:statement>
    </dsc:update>
</dsc:operations>
</dsc:config>
```

The WSDL 260 is a web service description language document which provides a model for describing a web service. A WSDL provides an XML-based description of a web service as well as providing a description of how to communicate with the web service by defining the public interface to the web service and informing a client of the functions available as well as any special datatypes associated with the web service. The WSDL 260 provides the information necessary for clients to interact with the described web service.

The WSDL 260, in one embodiment, is also created by the web service metadata tool 210 in response to a user 200 providing parameters defining a data access-based web service. The structure and function of a WSDL document is well-known to those in the art. One of skill in the art can create a tooling module such that a WSDL document is created from a user-specified set of operations and parameters for a web service. By way of example, the WSDL generated in connection with the example configuration document above is provided in Appendix A. Those of skill in the art will recognize that the WSDL in Appendix A provides a potential client of the web service defined by the configuration document above with the information necessary to make use of the web service, including the names and parameters of the provided operations.

The web service metadata 220, in one embodiment, further comprises a status 270. The status 270 field stores the operational status of the web service associated with the web service name 240. In one embodiment, the status 270 may be set to 'active' when the corresponding data access-based web service is available, and set to 'inactive' when the data access-based web service is disabled or otherwise unavailable. Alternatively, the presence of a row in a table of web services metadata 220 may indicate that the data access-based web service is active and the removal of the row may indicate that the data access-based web service is inactive.

The web services management metadata store 140, in one embodiment, further comprises a timestamp 280 associated with a data access-based web service. The timestamp provides a token that can be used to determine when or if a change to a data access-based web service was made. The creation of a new data access-based web service, editing an existing data access-based web service, or removing or inactivating a data access-based web service, as well as changes to a status or other component of the web service metadata 220 causes the web service metadata tool 210 to create a new timestamp 280. Preferably, these changes are made by a user interacting exclusively with the DBMS.

The web service metadata tool 210 may further comprise an editor module 212 for making changes to a data access-based web service in the web services management metadata store 140. A user 200 operates the editor module 212 to edit or delete a data access-based web service. In one embodiment, when a user 200 edits an existing data access-based web service, the web service metadata tool 210 overwrites the entries in the web services management metadata store 140 affected by the edit. The web service metadata tool 210 also creates a new timestamp 280 for the web service. If a user 200 deletes a data access-based web service, the web service metadata tool 210 may remove the metadata that defines the data access-based web service from the web services management metadata store 140 completely.

The web service metadata tool 210 further comprises a management module 214 which allows a user 200 to manage the operation of a data access-based web service from the database 130, instead of the application server 102. A user 200 uses the management module 214 to start or stop a data access-based web service. In one embodiment, the management module 214 starts and stops a service by changing the status 270 of a web service to either 'active' or 'inactive'. Alternatively, adding or removing metadata defining a data access-based web service affects whether the data access-based web service is activated or deactivated. The run time controller 110 detects the change and dynamically starts or stops the data access-based web service as indicated.

This allows the user 200 to easily control access to the database 130 by data access-based web services. The user 200 can easily cut off data access-based web service access to the database in order to perform database maintenance or other tasks. In one embodiment, the web service metadata tool 210 may further allow a user 200 to create a schedule defining the availability of data access-based web services.

Those of skill in the art will recognize that the web services metadata 220 may be more complex and comprise more fields than those shown in order to provide additional tools and functionality to a user 200. Additional tools and fields may support more advanced features such as versioning data access-based web services.

In addition, those of skill in the art will recognize that using the web service metadata tool 210 is not necessary to practice the invention; a user 200 may, for example, store the required information for the definition and operation of a data access-based web service directly into the web services management metadata store 140 using SQL statements.

In such an embodiment, the user 200 would have to properly create and define the relevant web service metadata 220, such as the web service name 240, web service configuration document 250, WSDL 260, status 270 and timestamp 280 in order for the present invention to function correctly. As such, the web service metadata tool 210 simplifies the process of creating the necessary web service metadata 220 by creating an abstraction insulating the user 200 from the mechanics of creating properly defined metadata in accordance with the present invention.

Figure 3:
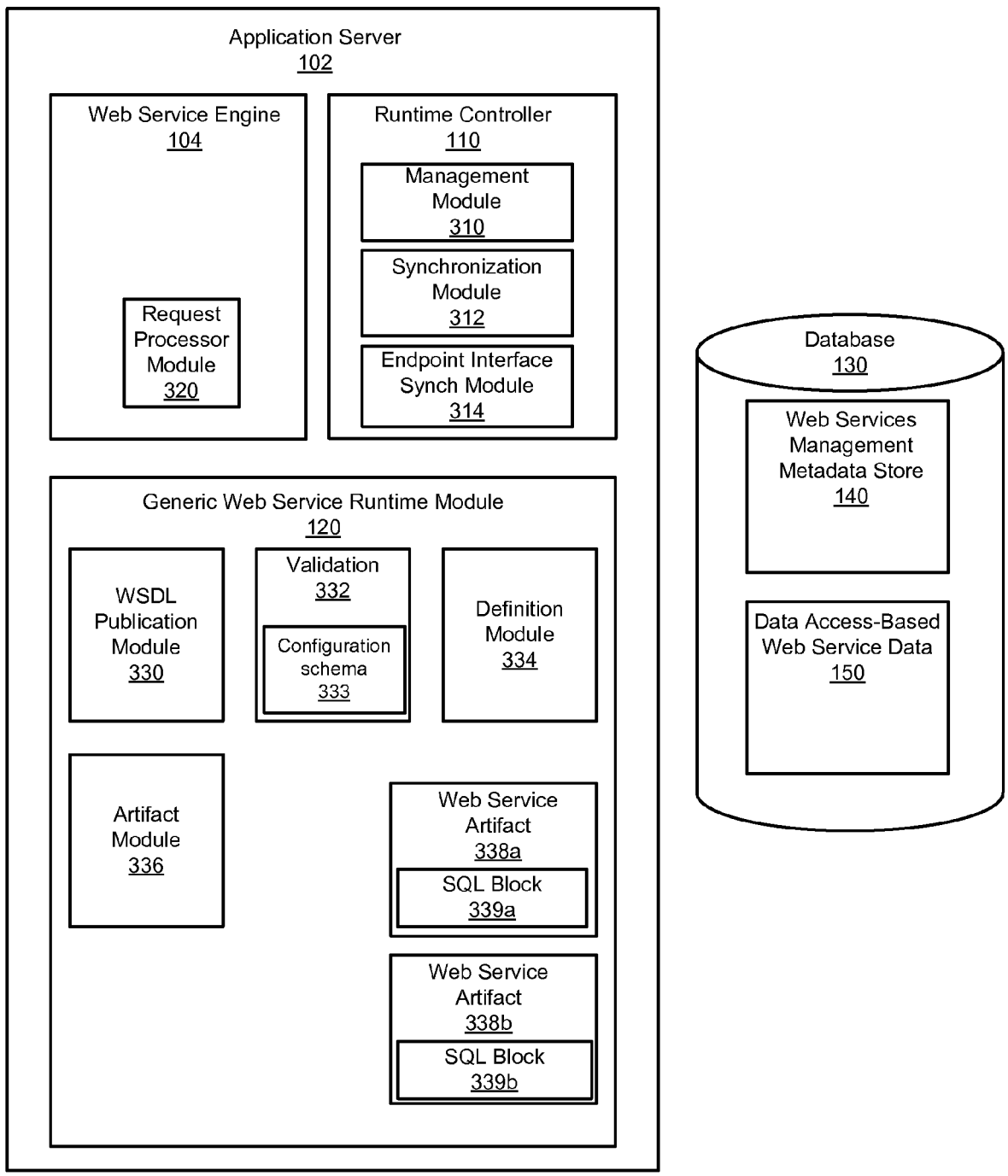
FIG. 3 is schematic block diagram illustrating one embodiment of an application server in accordance with the present invention.

FIG. 3 is schematic block diagram illustrating one embodiment of an application server 102 in accordance with the present invention. In the depicted embodiment, the application server 102 comprises a web service engine 104, a runtime controller 110, and a generic web service runtime module 120. FIG. 3 further depicts a database 130 comprising a web services management metadata store 140 and a data access-based web service data data store 150.

The runtime controller 110, as discussed above in conjunction with FIG. 1, further comprises a management module 310, a synchronization module 312, and an endpoint interface synchronization module 314. The management module 310 provides a user on the application server 102 with management tools for the generic web service runtime module 120.

For example, an application server user may use the management module 310 to start or stop the operation of the generic web service runtime module 120 on the application server 102. In addition, the management module 310 allows a user to deploy and configure a generic web service runtime module 120. The management module 310 also leverages the web service functionality provided by the tools on the application server 102, allowing a user to configure connectivity and security settings for the generic web service runtime module 120. For example, the management module 310 may use application server tools to allow a user to set up a password and ID associated with the generic web service runtime module 120.

The synchronization module 312 ensures that the data access-based web services exposed by the generic web service runtime module 120 are consistent with the definitions of those data access-based web services defined in the web services management metadata store 140. In one embodiment, the synchronization module 312 polls the web services management metadata store 140 at regular intervals in order to determine whether the most current data access-based web service definitions are in use. In such an embodiment, the synchronization module 312 may include a data structure, not shown in FIG. 3, comprising the web service name 240 and a timestamp 280. At regular intervals the synchronization module 312 polls the web services management metadata store 140 and extracts the timestamps 280 for the listed web service names 240. The synchronization module 312 then compares the extracted information to that kept in the synchronization module data structure. If the timestamps 280 do not match for a particular web service name 240, the web services management metadata store 140 has a changed definition and the synchronization module 312 directs the generic web service runtime module 120 to update the related data access-based web service operating on the application server 102.

If a web service name 240 and timestamp 280 are in the web services management metadata store 140 but not in the data structure, the synchronization module 312 directs the generic web service runtime module 120 to create and start the data access-based web service operating on the application server 102. If the data structure contains a web service name 240 but the same web service name 240 is not found in the web services management metadata store 140, the synchronization module 314 directs the generic web service runtime module 120 to halt the data access-based web service operating on the application server 102.

In an alternative embodiment, the synchronization module 312 may determine whether or not there has been a change to the web services management metadata store 140 based on a polling interval. For example, if a polling interval is set for every five minutes, the synchronization module 312 can determine whether the generic web service runtime module 120 needs to update a data access-based web service by determining if any timestamps 280 were changed in the past five minutes. Consequently, in such an embodiment a status field 270 may not be needed. Those of skill in the art will recognize that multiple methods exist to synchronize data and ensure consistency, including notification configurations. Embodiments of the invention are not limited to or dependent upon the use of any particular synchronization method.

The endpoint interface synchronization module 314 ensures that the web service engine 104 has the current endpoint interface definitions needed to allow access to the data access-based web services. A web service endpoint interface specifies the location on an application server where a web service artifact 338 associated with that particular web service endpoint interface is defined. When the artifact module 336 creates an endpoint interface for a data access-based web service the artifact module 336 notifies the endpoint interface synchronization module 314, which provides the endpoint interface and an identifier of the associated data access-based web service to the web service engine 104.

The generic web service runtime module 120 also includes a definition module 334, a validation module 332, a WSDL publication module 330, an artifact module 336, and web service artifacts 338a-b. The definition module 334 is invoked when the runtime controller 110 determines that there is a need to update a data access-based web service operating on the application server 102. If a data access-based web service has been added or edited, the definition module 334 retrieves the web service configuration document 250 associated with the data access-based web service from the web services management metadata store 140. If a data access-based web service was removed, the definition module 334 destroys the web service artifact 338 corresponding to the removed web service and indicates to the endpoint interface synchronization module 314 that the web service endpoint interface is no longer valid and should be removed from the web service engine 104.

The validation module 332 receives a web service configuration document 250 from the definition module 334. The validation module further comprises a web service configuration schema 333. The web service configuration schema 333 lays out an acceptable structure of a web service configuration document 250, specifying the structure of a web service configuration document 250 that the generic web services runtime module 120 can process. In one embodiment, the web service configuration schema 333 is an XML schema document.

The validation module 332 uses the web service configuration schema 333 to determine whether the web service configuration document 250 is a compliant document. Methods and tools for validating a document based on a schema are well known to those in the art. In one embodiment, if a web service configuration document 250 does not comply with the web service configuration schema 333, the validation module 332 provides a database user 200 who creates and manages data access-based web services with a message indicating that the particular web service could not be created and indicating what problems were encountered.

The WSDL publication module 330 makes a WSDL available to the data access-based web service clients. The WSDL publication module 330 retrieves the WSDL 260 associated with a validated web service from the web services management metadata store 140. In one embodiment, the WSDL publication module 330 makes the WSDL 260 available through a service broker such as the Universal Description Discovery and Integration (UDDI) registry. The WSDL publication module 330 makes the protocol bindings and message formats required to interact with the web service, as described in the WSDL 260, available for consumption.

The artifact module 336 receives a web service configuration document 250 from the validation module 332 if the web service configuration document 250 is compliant with the web service configuration schema 333. The artifact module 336 interprets the web service configuration document 250 and creates the web service artifact 338 according to the specifications given in the web service configuration document 250. The artifact module 336 also creates the appropriate endpoint interface for the web service artifact 338 and provides the endpoint interface synchronization module 314 with the endpoint interface for the data access-based web service.

The web service artifact 338, also referred to as the web service runtime artifact, comprises executable code that performs database operations, as specified by the web service configuration document 250, in response to a request from a data access-based web service. The web service artifact 338 may also contain additional operations to be performed either before or after the execution of the database operations. The web service artifact 338 performs the necessary database operations, along with the other related operations, that make up the data-access based web service. In one embodiment, these database operations are SQL statements represented as SQL Block 339. Those of skill in the art will recognize that other languages or statements can be used to execute the database operations as defined in the web service configuration document 250. The web service artifact 338 receives requests for service and the parameters associated with that request from a request processor module 320 in the web service engine 104. The web service artifact 338 executes the code in response to the request, using the provided parameters, and returns the results of the operations to the request processor module 320.

For example, a web service artifact 338 may receive a web service request with an operation name "addEmployee", as shown above in the example web service configuration document 250. A valid request also comprises the parameters empno, firstname, midinit, and others shown above in connection with the "addEmployee" operation. The web service artifact 338a then executes the SQL statements associated with the operation such that the employee is added to the data access-based web service data data store 150 in the database 130. While this particular operation does not return information from the data access-based web service data data store 150 to the client that requested the web service, the web service artifact 338 may return a flag or indicator of a successful update to the request processor module 320.

The generic web service runtime module 120 may comprise multiple web service artifacts 338a-b, as depicted in FIG. 3. The number of web service artifacts 338 in the generic web service runtime module 120 corresponds to the number of data access-based web services defined in the web services management metadata store 140. For example, if there are ten different data access-based web services defined in the web services management metadata store 140, the generic web service runtime module 120 will have ten different web service artifacts 338 representing the distinct web services available. Those of skill in the art will recognize, however, that the web service artifacts 338a-b may be configured such that they can be used by other data access-based web services; for example, a data access-based web service may require the database operations performed by web service artifacts 338a-b in addition to other operations; the new data access-based web service may make use of web service artifacts 338a-b to execute the operations they provide rather than replicate those same operations. Such a configuration may be used to reduce redundancy between web service artifacts.

The preferred embodiments add an additional element to the hot deployment of web services; generally, hot deployment refers to the ability to add or edit components such as web services to an application server 102 without restarting the application server 102 before those components take effect. The preferred embodiments extend the concept of hot deployment by allowing a user to create, modify, and manage data access-based web services without restarting the generic web service runtime module 120. The user 200 can therefore define, manage, and deploy data access-based web services without restarting either the application server 102 or the generic web service runtime module 120 before those services are available. As such, the preferred embodiments allow a user 200 to perform data access-based web service tasks from the database side without making any manual changes to the application server 102 which hosts the data access-based web service.

The web service engine 104 comprises the core functionality provided by the application server 102 for handling and processing web services requests. The web service engine 104 receives web service requests and sends web service responses. The web service engine 104 maintains a set of configuration data (not shown) regarding the available web services such that the web service engine 104 knows how to handle requests for a particular web service. This configuration data includes the endpoint interface definitions associated with the web service artifacts available on the application server 102. The endpoint interface synchronization module 314 of the runtime controller 110 updates the endpoint interface definitions associated with the web service artifacts 338 and otherwise ensures that the configuration data is kept in synchronization with the current status of data access-based web services in the generic web service runtime module 120.

When a client 160, as depicted in FIG. 1, sends a web service request to the application server 102, the web service engine 104 receives the request. The request processor module 320 in the web service engine 104 unwraps the SOAP web service request and extracts the operation and the parameters from the request. If the requested service does not exist, the request processor module 320 responds with an error indicating that the service was not found. Otherwise, the request processor module determines the appropriate web service on the application server 102 and provides it with the parameters to allow the web service to execute.

If the requested web service is a data access-based web service defined in the web services management metadata store 140, the request processor module 320 uses the endpoint interface information in its configuration data to forward the parameters to the web service artifact 338 associated with the web service request. The web service artifact 338 receives the parameters from the request processor module 320 and executes the SQL statements in the SQL Block 338 on the data access-based web service data data store 150. The web service artifact 338 also executes any other instructions which are a part of the data access-based web service. The web service artifact 338 returns the results of the operations to the request processor module 320 in the Web Service Engine 320. The request processor module 320 then constructs a SOAP envelope for the response and may perform additional processing of the data, such as providing encryption for security purposes. Once the request processor module 320 completes the pre-response processing, the request processor module 320 returns the SOAP response to the requesting client 160.

Figure 4:
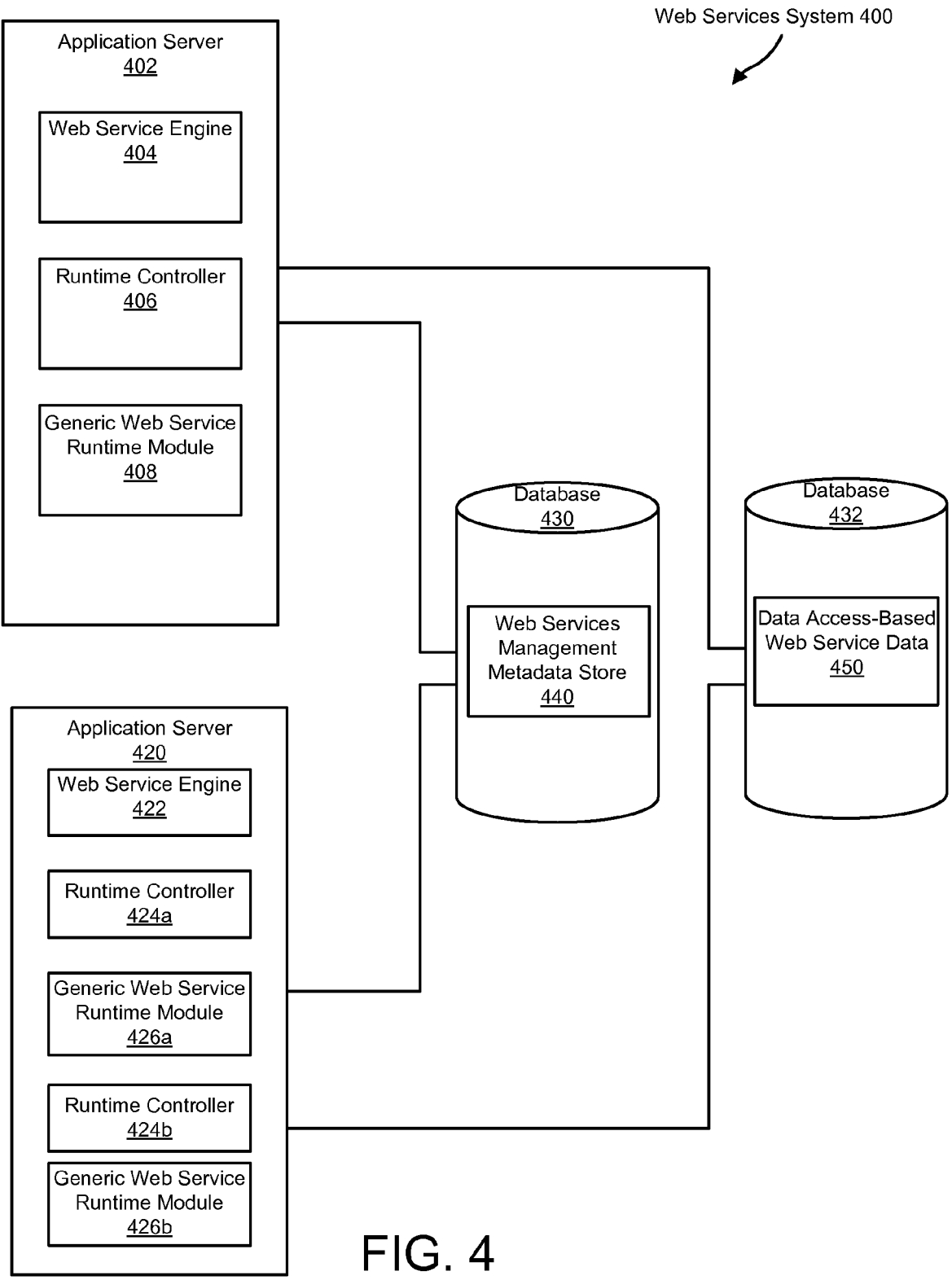
FIG. 4 is a schematic block diagram illustrating one embodiment of a web services system comprising multiple application servers and multiple databases in accordance with the present invention.

FIG. 4 is a schematic block diagram illustrating one embodiment of a web services system 400 comprising multiple application servers 402, 420 and multiple databases 430, 432. Application server 402 includes a web service engine 404, runtime controller 406, and generic web service runtime module 408. FIG. 4 depicts application server 402 in electronic communication with a database 430 which includes the web services management metadata store 440 and a database 432 comprising a data access-based web service data data store 450.

FIG. 4 illustrates that the data stores 440 and 450 can be physically separate repositories. Additional configurations are possible where the data access-based web service data data store 450 is located on multiple physical units. A web services management metadata store 440 may also be implemented as a subset of a data access-based web service data data store 450; such a configuration may be useful, for example, to create a data access-based web service which allows the generic web service runtime module 408 to 'bootstrap'; that is, a user may develop a data access-based web service to manage and configure the web services management metadata store 440 itself, as a subset of the data access-based web service data data store 450. In such an embodiment, the web service metadata tool 210 may itself be a web service provided by a generic web service runtime module 408.

Communication between the application servers 402 and 420 to the data stores 440 and 450 located on databases 430 and 432 is crucial to the proper operation of the web services system 400. Application server 420 includes a web service engine 422, runtime controllers 424a-b and generic web service runtime modules 426a-b. Each generic web service runtime module 426a-b has one associated runtime controller 424a-b. Each runtime controller 424a-b and each generic web service runtime module 426a-b is configured to communicate with the web services management metadata store 440 and the data access-based web service data data store 450. In addition, each runtime controller 424a-b contributes to the maintenance of accurate configuration data in the web service engine 422. The runtime controllers 424a-b manage the configuration data related to the data access-based web services associated with their respective generic web service runtime modules 426a-b.

As a result, an individual may easily maintain data access-based web services in accordance with certain embodiments of the invention from a database even when an n-to-n application servers to databases relationship exists. For example, a database administrator may create a new data access-based web service definition in the web services management metadata store 440 as described in FIG. 2. When the new web service definition is detected by the runtime controllers 406, 424a, and 424b, each runtime controller directs the respective generic web service runtime modules 408, 426a, and 426b to create data access-based web services as described in connection with FIG. 3. The runtime controllers 406, 424a, and 424b also provide the information enabling the activation of these web services to the web service engines 422 and 404 as described in the discussion of FIG. 3.

Managing and creating data access-based web services in this manner provides a number of advantages; a web service can easily be deployed with high availability by providing multiple embodiments of that service. A user can deploy multiple copies of a particular data access-based web service in a single operation on the database side. In addition, the present invention simplifies the maintenance of a data access-based web service distributed over numerous application servers; as above, the changes can be made on various application servers through a single operation at the database. Further, those of skill in the art will recognize that this holds true even where the application servers are not of the same type; thus, a single operation can update or deploy data access-based web services across a WebLogic Server, WebSphere Server, and Oracle OC4J Server simultaneously without requiring the user to account for the differences in the application server platforms. The differences are handled when the embodiments of the invention are deployed on the different platforms; once the runtime controllers 406 and 424a-b and generic web service runtimes 408 and 426a-b are in place, they use the web service metadata to create the data access-based web services on their particular application server 402 and 420 platforms.

The schematic flow chart diagrams that follow are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

Figure 5:
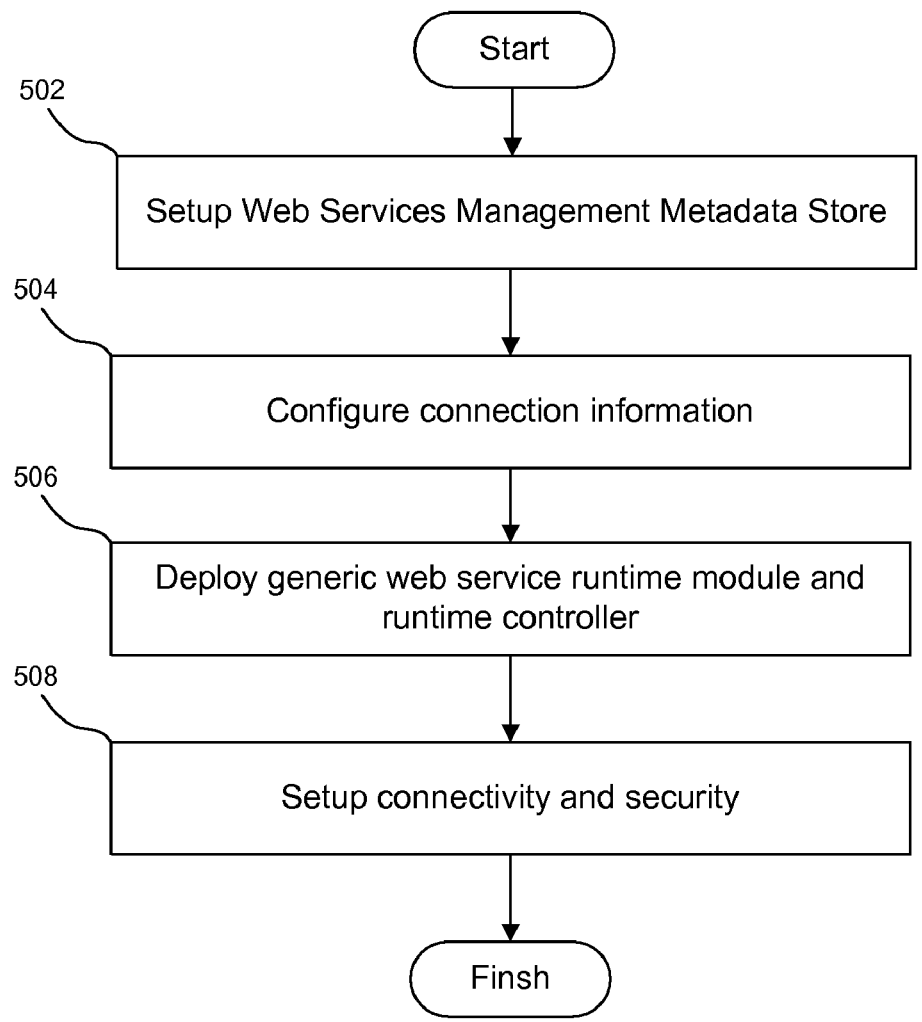
FIG. 5 is a schematic flow chart diagram illustrating one embodiment of a method for deploying a generic web services runtime module in accordance with the present invention.

FIG. 5 is a schematic flow chart diagram illustrating one embodiment of a method for deploying a generic web services runtime module in accordance with the present invention. The deployment of a generic web service runtime module 120 and the associated actions described in connection with FIG. 5 constitute a one-time action necessary prior to practicing the management of data access-based web services in accordance with the present invention. A user 200 sets up 502 the web services management metadata store 140 on the database 130. The user 200 may, for example, issue CREATE TABLE statements to set up the web services management metadata store 140 and define the fields and structure appropriately. In one embodiment, the CREATE TABLE statements may be as follows:

```
CREATE TABLE services (name VARCHAR (50) NOT NULL,
config XML NOT NULL, wsdl XML, lastModified TIMESTAMP,
PRIMARY KEY (name)) CREATE TABLE servicesXSLTScripts
(serviceName VARCHAR (50) NOT NULL, xsl XML NOT NULL,
fileName VARCHAR (255) NOT NULL, CONSTRAINT
FK__SERVICES FOREIGN KEY (serviceName) REFERENCES
services (name) ON DELETE CASCADE);
```

Those of skill in the art will appreciate that the exact statements issued can vary and will depend upon the information that the user wishes to keep in the web services management metadata store 140.

A user with access to, and appropriate privileges on, the application server 102 configures 504 connection information to the database 130 such that application server 102 can access information on the database 130, allowing the runtime controller 110 and generic web service runtime module 120 to access the web services management metadata store 140 and data access-based web service data data store 150. As explained above in connection with FIG. 4, the user may have to configure connection information for multiple databases in certain embodiments of the web services system. The user also deploys 506 the generic web service runtime module 120 and runtime controller 110 on the application server 102. Deploying these modules may further include ensuring that the modules can properly access, and be accessed by, the calls from the web service engine 104 such that the coordination necessary to the present invention, as described above, can occur.

The application server user also sets up 508 any connectivity and security settings necessary for the generic web service runtime module 120. For example, the application server user may perform additional fine-tuning such as creating and setting user ID and passwords. Once the generic web service runtime module 120 is properly deployed and configured, a user 200 may begin to manage data access-based web services from the database 130 in accordance with the present invention.

Figure 6:
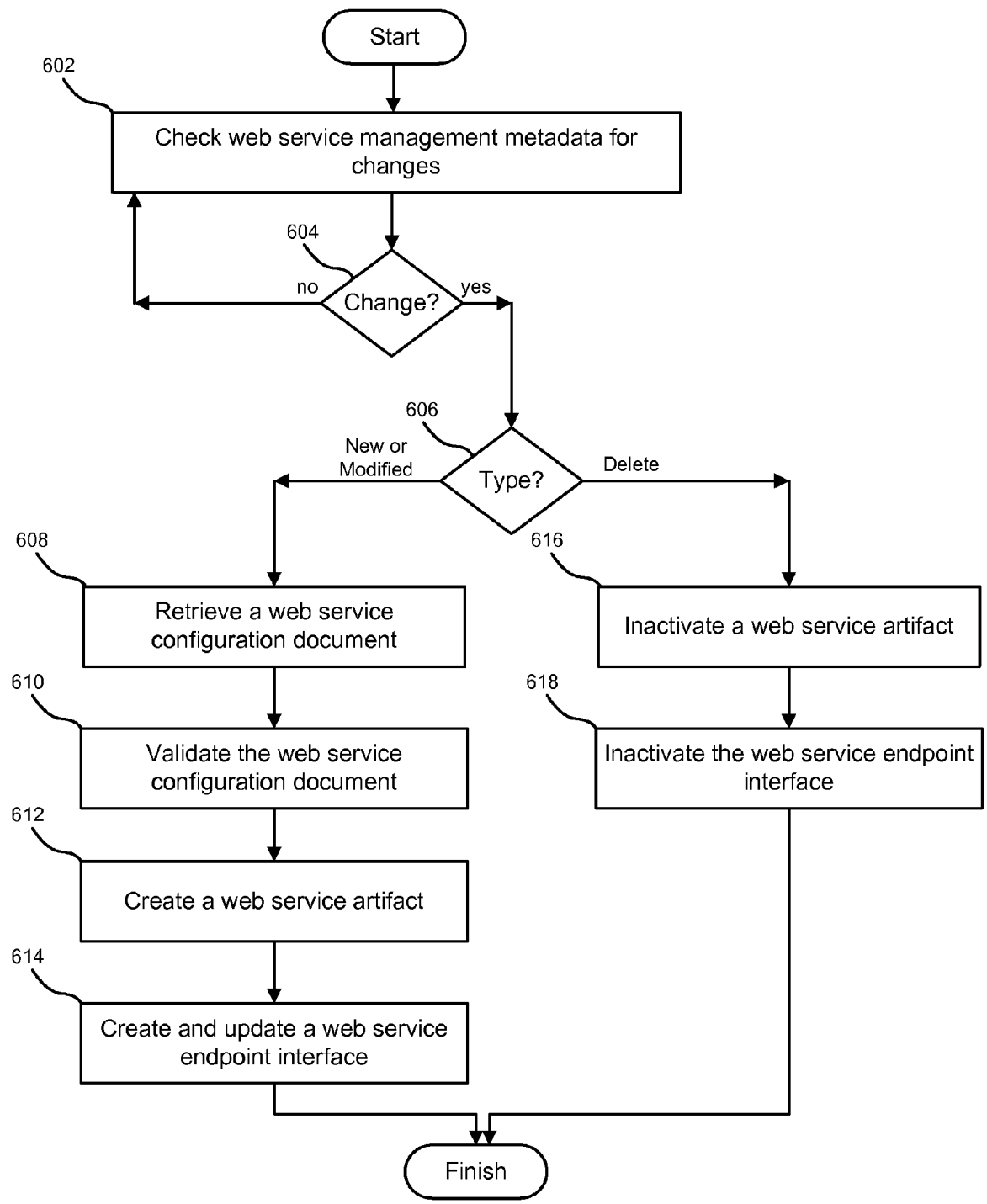
FIG. 6 is a schematic flow chart diagram illustrating one embodiment of a method for creating a web service in accordance with the present invention.

FIG. 6 is a schematic flow chart diagram illustrating one embodiment of a method for creating a web service in accordance with the present invention. A runtime controller 110 checks 602 a web services management metadata store 140 for changes to the web services management metadata using a synchronization module 312. The synchronization module 312 determines 604 whether or not there has been a change in the metadata; if there has been no change, the synchronization module 312 waits until the next polling interval and repeats its determination 604 until the synchronization module 312 detects a change in the web services management metadata store 140. If a change occurs, the synchronization module 312 further determines 606 whether the change is the addition or modification of a data access-based web service or a deletion. Those of skill in the art will recognize that there are more possible changes than those listed; for example, a change may simply be a change in the status 270 of the web service, in which case the affected web service is either deactivated or reactivated based on the command. While additional actions are not depicted in the example, the scope of the claimed invention is not limited to the addition, modification, or removal of web services.

If a change in the web services management metadata store 140 indicates that an existing web service should be modified or that a new web service should be created, the definition module 334 retrieves 608 a web service configuration document 250. The validation module 332 then validates 610 the web service configuration document 250 against a web service configuration schema 333. The artifact module 336 creates 612 a web service artifact 338 from the validated web service configuration document 250. The artifact module 336 also creates 614 a web service endpoint interface for the web service, and the endpoint interface synchronization module 314 registers the updated configuration information comprising the endpoint interface with the web service engine 104. The newly-created or modified data access-based web service is then ready to process web service requests.

If the synchronization module 312 determines 606 that the operation is a delete operation, the artifact module 336 inactivates 616 the affected web service artifact 338, and also instructs the endpoint interface synchronization module 314 to inactivate 618 the web service endpoint interface from the configuration information in the web service engine 104. In one embodiment, inactivation of the web service artifact 338 and web service endpoint interface simply constitutes deleting the artifact and interface. The artifact module 336 leverages the dynamic deployment of web services of the application server 102 to halt and/or remove the web service artifact 338. Advantageously, the user need not interact with the application server 102.

Figure 7:
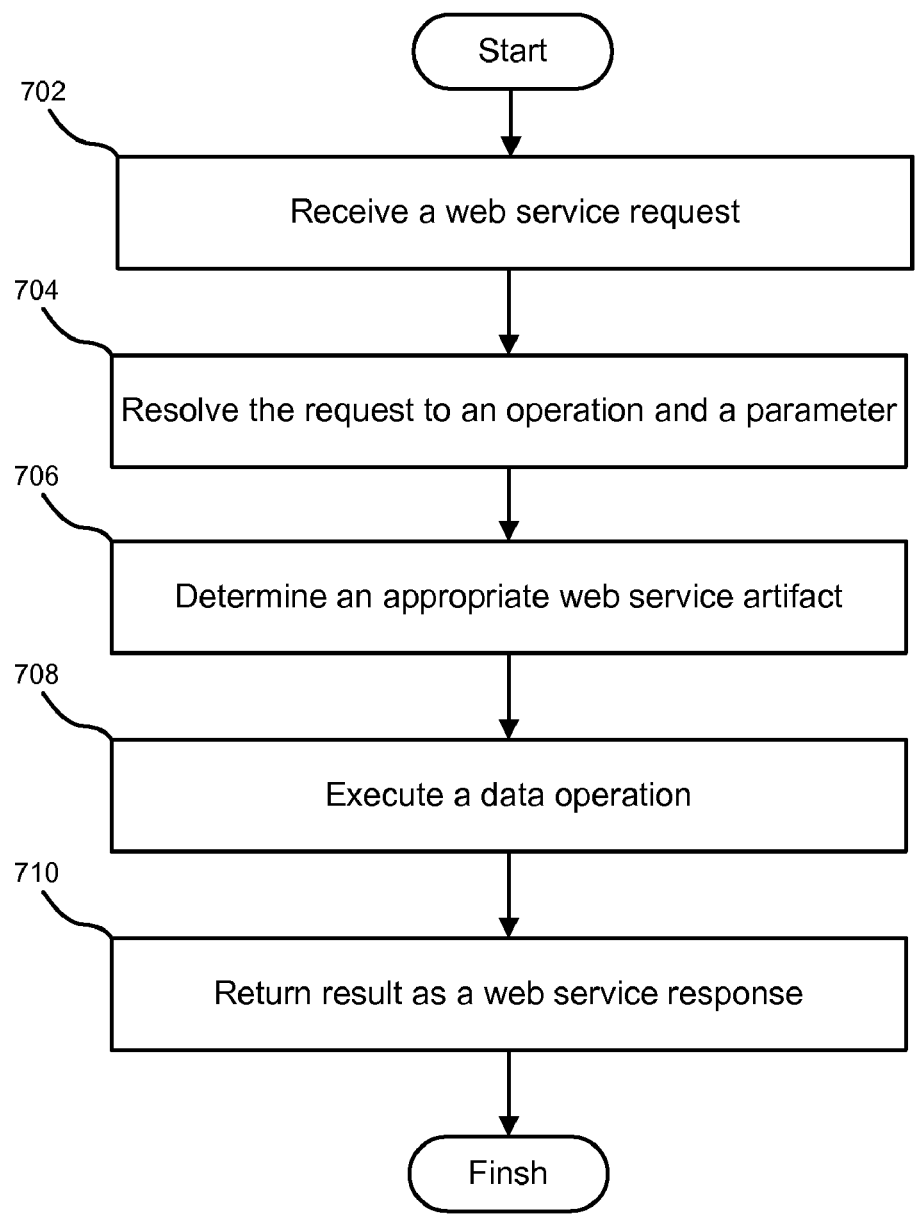
FIG. 7 is a schematic flow chart diagram illustrating one embodiment of a method for handling a web service request in accordance with the present invention.

FIG. 7 is a schematic flow chart diagram illustrating one embodiment of a method for handling a web service request. A client 160 sends a web service request to the application server 102. The request processor module 320 receives 702 the request. The request processor module 320 resolves 704 the request to an operation and associated parameters. The request processor module 320 determines 706 an appropriate web service artifact 338 associated with the web service request.

The request processor module 320 passes control and any parameters to the associated web service artifact 338 which executes 708 a data-access based data operation in the form of a web service. In one embodiment, executing a data operation may consist of executing the statements in an SQL block 339. When the data operation has been successfully executed, the web service artifact 338 passes any result to the request processor module 320. The request processor module 320 returns 710 the result as a web service response. Returning the request as a web service response may further comprise composing the response into an appropriate SOAP envelope (or other loosely coupled network format) and performing any additional necessary data processing such as encryption.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computer program product comprising a computer useable medium having a computer readable program for a data server-managed web services runtime, the operations of the computer program product comprising:
   a generic web service runtime module accessing web service metadata in a web services management metadata store, wherein the web service metadata defines behavior and structure of a data access based web service for accessing data in a datastore: wherein the web service metadata is defined on a database management system (DBMS), and wherein the web service metadata comprises: a web service name, a web service configuration document, a web services description language document and a timestamp;
   the generic web service runtime module creating a data access-based web service from the web service metadata, the generic web service runtime module operating on an application server;
   a synchronization module monitoring for a change in the web service metadata in the web services management metadata store;
   and the generic web service runtime module automatically managing the data access based web service defined by the web service metadata in response to detecting the change in the web service metadata in the web services management metadata store;
   the application server configured to support dynamic deployment of web services.

2. The computer program product of claim 1, wherein a the change in the web service metadata comprises web service metadata added to a web services management metadata store, automatically managing the data access based web service further comprising:
   retrieving the web service configuration document from the web services management metadata store on the DBMS;
   creating an executable web service artifact from the web service configuration document, the web service configuration document satisfying a web service configuration schema; and starting the executable web service artifact such that a request processor associated with the generic web service runtime module accepts requests associated with the web service artifact.

3. The computer program product of claim 2, further comprising creating a web service endpoint interface associated with the web service artifact and providing the web service endpoint interface to a web services engine.

4. The computer program product of claim 2, wherein starting the web service artifact further comprises the web service artifact executing web service requests without the generic web service runtime module restarting.

5. The computer program product of claim 1, wherein the change in the web service metadata comprises the web service metadata being removed from the web services management metadata store, and wherein automatically managing the data access based web service comprises inactivating a web service runtime artifact associated with the data access based web service identified by the removed web service metadata.

6. The computer program product of claim 5, further comprising inactivating a web service endpoint interface in a web services engine, the web service endpoint interface associated with the web service runtime artifact.

7. The computer program product of claim 1, wherein the change in the web service metadata is determined by evaluating the timestamp associated with the data access-based web service defined by the web service metadata in the web services management metadata store.

8. The computer program product of claim 1, wherein a user defines the web service metadata in the web services management metadata store using a tool provided by the database management system (DBMS).

9. The computer program product of claim 2, wherein the web service configuration document is an XML file and the web service configuration schema is an XML Schema document.

10. The computer program product of claim 2, wherein the web service configuration document specifies Structured Query Language (SQL) data operations on a data store.

11. The computer program product of claim 1, further comprising publishing a web services description language (WSDL) document associated with the data access based web service.

12. A computer program product comprising a computer useable medium having a computer readable program for a data server-managed web services runtime, the computer program product comprising:
   a generic web services runtime module accessing web service metadata from a data store, wherein the data store comprises web services metadata and data access based web service data, the web services metadata defining behavior and structure of a data access based web service for accessing data in a datastore, wherein the web service metadata is defined on a database management system (DBMS), and wherein the web service metadata comprises: a web service name, a web service configuration document, a web services description language document and a timestamp;

the generic web services runtime module automatically changing the availability of the data access based web service in response to a change in the web service metadata in the data store, wherein the data-access based web service is created by the generic web service runtime module using the web service metadata and executed by the generic web service runtime module deployed on an application server using the web service metatada metadata, the application server configured to support dynamic deployment of web services;

a runtime controller comprising a synchronization module, the synchronization module configured to determine that there is a change in the web service metadata in the data store and notifying the generic web services runtime module of the change; and the application server configured to support dynamic deployment of web services.

13. The computer program product of claim 12, wherein the generic web services runtime module further comprises:

a definition module configured to retrieve the web service configuration document from the web services management metadata store in response to the runtime controller notifying the generic web service runtime module that a new data access based web service exists;

a validation module configured to validate the web service configuration document against a web service configuration schema associated with the generic web services runtime module; and an artifact module configured to create a web service runtime artifact based on the web service configuration document, the web service configuration document satisfying the web service configuration schema associated with the generic web service runtime module, the artifact module further creating a web service endpoint interface associated with the web service runtime artifact.

14. The computer program product of claim 12, the runtime controller further comprising an endpoint interface synchronization module configured to utilize dynamic deployment services of the application server to provide a web service engine with a web service endpoint interface such that the web service engine accepts requests associated with the web service endpoint interface.

15. The computer program product of claim 12, the runtime controller further comprising a management module configured to allow a user to start, stop, and configure a generic web services runtime module from the application server.

16. The computer program product of claim 13, wherein the change in the web service metadata comprises web service metadata being removed from the web service management metadata store, the definition module further configured to utilize dynamic deployment services of the application server to remove the web service runtime artifact associated with the removed data access based web services definition and to notify the runtime controller of the removal of the web service runtime artifact, the runtime controller configured to utilize dynamic deployment services of the application server to remove a web service endpoint interface associated with the removed web service runtime artifact.

17. The computer program product of claim 12, the runtime controller determining that there is a change in the web service metadata by evaluating a timestamp associated with the web service metadata in the web services management metadata store against a polling interval.

18. The computer program product of claim 12, wherein a user defines the web service metadata in the web services management metadata store through a web service metadata tool.

19. The computer program product of claim 13, wherein the web service configuration document is an XML document and the web service configuration schema is an XML Schema document.

20. The computer program product of claim 12, wherein the web service configuration document specifies SQL data operations on a data store.

21. The computer program product of claim 12, the generic web services runtime further comprising a WSDL publication module publishing a web services description language (WSDL) document associated with a data access based web service.

22. A system for operation of a data server-managed web services runtime, the system comprising:

an application server configured to support dynamic deployment of web services and host a plurality of web services runtime modules, the application server comprising a memory device and at least one processor;

a database management system (DBMS) comprising a web services management metadata store comprising web services metadata; the metadata comprising: a web service name, a web service configuration document, a web services description language (WSDL) document, a web service status and a timestamp;

the DBMS further comprising a data access based web service data datastore comprising web service-accessible data and stored procedures;

the application server further comprising a runtime controller configured to operate on the application server and to manage a single unique generic web service runtime; and the application server further comprising a generic web service runtime module configured to operate on the application server and to create one or more web service artifacts for one or more web services from the web service configuration document the data-access based web services configured to access the data access based web service data datastore;

wherein the web service metadata defines behavior and structure of a data access based web service for accessing data in a datastore:

a synchronization module monitoring for a change in the web service metadata in the web services management metadata store;

and the generic web service runtime module automatically managing the data access based web service defined by the web service metadata in response to detecting the change in the web service metadata in the web services management metadata store.

23. The system of claim 22 further comprising a web service metadata tool that is part of the DBMS and that is configured to communicate with the web services management metadata store, the web service metadata tool configured to:

expose a user to data-access based web service data and stored procedures available for deployment as a data access based web service;

receive metadata from the user, the metadata defining a new data-access based web service;

generate a the web service configuration document and the WSDL document from the user metadata; and store the web service name, the web service configuration document, the WSDL document, the status, and the timestamp in the web services management metadata store.

24. The system of claim 22, wherein the runtime controller further comprises: a synchronization module configured to determine a change in the web services management metadata store and to notify the generic web service runtime module of the change; an endpoint interface synchronization module configured to maintain web service endpoint interface definitions in a web service engine; and a management module configured to enable start and stop operations on web service artifacts on a generic web services runtime module.

25. A system for operation of a data server-managed web services runtime, the system comprising:

a plurality of application servers, the application servers configured to support dynamic deployment of web services and host a plurality of web services runtime modules and runtime controllers, the application servers comprising a memory device and at least one processor;

a plurality of databases comprising a database management system (DBMS), the databases further comprising a common web services management metadata store and a common data access-based web service data datastore, the web service management metadata store comprising web service metadata defining behavior and structure of a data access based web service, the web service metadata comprising a web service name, a web service configuration document, and a web services description language document and a timestamp; and a plurality of generic web service runtime modules configured to operate on one of the plurality of application servers and to create one or more executable web service artifacts on the application servers, the executable web service artifacts created using one or more for one or more web services from a web service configuration documents stored in the web services management metadata store and defined by a user from the DBMS;

the generic web service runtime module creating a data access-based web service from the web service metadata, a synchronization module monitoring for a change in the web service metadata in the web services management metadata store;

and the generic web service runtime module automatically managing the data access based web service defined by the web service metadata in response to detecting the change in the web service metadata in the web services management metadata store.

26. The system of claim 25, wherein the generic web services runtime modules on the plurality of application servers further comprise redundant web service artifacts defining data access based web services, the redundant web service artifacts derived from web service metadata stored in the common web services management metadata store.

27. The system of claim 25, wherein the plurality of application servers comprises heterogeneous platforms.

28. The system of claim 25, wherein an application server further comprises a plurality of runtime controllers and generic web service runtime modules.

29. The system of claim 28, wherein the runtime controllers each have an associated unique generic web service runtime module.

30. The system of claim 28, wherein the generic web service runtime modules further comprise redundant web service artifacts defining data access based web services, the redundant web service artifacts derived from web service metadata stored in the common web services management metadata store.

* * * * *